United States Patent [19]

Hoffman

[11] 4,240,630
[45] Dec. 23, 1980

[54] GAME BALL CHECK VALVE

[76] Inventor: Allan C. Hoffman, 2891 Rumsey Dr., Riverside, Calif. 92506

[21] Appl. No.: 895,117

[22] Filed: Apr. 10, 1978

Related U.S. Application Data

[63] Continuation-in-part of Ser. No. 777,318, Mar. 14, 1977, abandoned, which is a continuation-in-part of Ser. No. 623,795, Oct. 20, 1975, Pat. No. 4,012,041.

[51] Int. Cl.³ .................. F16K 15/16; A63B 39/04
[52] U.S. Cl. ............................ 273/61 R; 273/65 D; 273/61 D; 137/846; 152/349; 152/427
[58] Field of Search ............ 273/65 D, 61 D, 61 R, 273/65 C, 65 E, 65 ED; 137/846, 849, 869; 152/349, 336, 427

[56] References Cited

U.S. PATENT DOCUMENTS

| | | | |
|---|---|---|---|
| 274,447 | 3/1883 | Kennish | 273/65 D |
| 1,389,362 | 8/1921 | Jones | 273/65 D |
| 1,942,959 | 1/1934 | Fenton | 273/65 D |
| 2,288,889 | 7/1942 | Costello | 273/65 D |
| 2,644,663 | 7/1953 | Klinger | 273/65 D |
| 2,737,969 | 3/1956 | Iknayan | 273/65 D |
| 2,830,610 | 4/1958 | Chupa | 273/65 D |
| 3,116,747 | 1/1964 | Cowles et al. | 137/846 X |
| 3,422,844 | 1/1969 | Grise | 137/846 X |
| 3,822,720 | 7/1974 | Souza | 137/846 |
| 3,861,416 | 1/1975 | Wichterle | 137/849 |
| 4,012,041 | 3/1977 | Hoffman | 273/61 D |

FOREIGN PATENT DOCUMENTS

355731 8/1961 Switzerland .............. 273/65 D

Primary Examiner—George J. Marlo
Attorney, Agent, or Firm—Poms, Smith, Lande & Rose

[57] ABSTRACT

An improved check valve is disclosed primarily for use in game balls such as tennis balls, racquet balls, footballs, basketballs, and the like. The valve is adapted for molding into the shell of the game ball upon initial manufacture or for insertion therein as part of a valve insert subsequent to manufacture. The valve is characterized by being of unitary construction and having a normally open and a normally closed portion. The valve is constructed of a tapered deformable elastomeric material such that the normally closed portion seals the ball against low initial internal pressures sufficiently to allow the internal pressure within the ball to deform the normally open portion into wedged engagement with the passageway through the wall of the ball. As thus configured, increased internal pressure wedges the normally open portion increasingly tightly into the passageway to provide a tight seal which is resistant to opening upon impact of the ball. The normally open portion is provided with knife edges and a polished surface on the interior to provide leak-free sealing.

5 Claims, 27 Drawing Figures

4,240,630

GAME BALL CHECK VALVE

This is a continuation-in-part of application Ser. No. 777,318, filed Mar. 14, 1977, now abandoned, which was a continuation-in-part of application Ser. No. 623,795, filed Oct. 20, 1975, now issued as U.S. Pat. No. 4,012,041.

BACKGROUND OF THE INVENTION

The present invention relates to check valves for incorporation within a passageway to allow fluid flow in only one direction therethrough, and more particularly, to check valves incorporated in the walls of game balls and the like for the inflation thereof.

Certain types of game balls such as basketballs and volleyballs, are made with relatively thin rubber shells which are inflated by air pressure to several pounds per square inch, so as to give them a lively bounce and action that makes for a fast game. Typically, a small unitary check valve is disposed within the wall of the game ball for the insertion of initial pressurizing air into the interior of the game ball. During the course of time, the pressurizing air leaks slowly through the rubber by diffusion through the molecular spaces in the rubber and through the pressurizing check valve due to the construction method thereof and momentary opening thereof due to shocks induced in the playing of the game played with the game ball.

Other types of game balls, such as tennis balls and racquet balls, are also made with relatively thin rubber shells which are gas pressurized at manufacture. In the prior art, tennis balls and racquet balls have not been provided with pressurizing valves since the check valves available in the teaching of the prior art were incapable of withstanding the shocks attendant the game so as to prevent the small volume of pressurized gas contained therein from leaking out. Thus, in tennis balls and racquet balls, the amount of leakage has primarily been a function of the time that has elapsed since the pressurized can the ball was shipped in was opened. Thus, a brand new tennis ball or racquet ball that has been used only once or twice and then set aside for a few weeks may be found to be considerably softened and somewhat dead when used again in play. Inasmuch as tennis balls are fairly expensive, the cost can become an objectionable item when a ball goes dead after being used only a few times.

Another shortcoming of tennis balls is that they rarely have the exact same bounce. Sometimes, in fact, a brand new ball will have so little bounce that it cannot be used at all. One measure of "bounce" is that determined by dropping the ball from a given height. Ideally, all brand new balls dropped from a given height should bounce up to the same level. This is seldom the case. As a result, when players use one ball after another, the action of each ball becomes unpredictable. Under such conditions, the players may have difficulty in controlling their shots. This is particularly important in tournament type play wherein the same advantage should be had by all players at all times.

In my U.S. Pat. No. 4,012,041, a method is disclosed wherein tennis balls and racquet balls can be provided with a check valve for the maintenance of such balls in identical playing condition to preselected standards. Such a method, of course, requires a check valve which will be able to withstand the rigors of the tennis or racquet ball game without attendant loss of pressure contrary to the ability of prior art game ball check valves.

Such problems also exist in other apparatus employing check valves used in pressurization processes or for the control of the unitary flow of fluid through a passageway. For example, the typical automobile tire is provided with a complex check valve employing springs, threaded metal parts, and elastomeric seals in order to provide a repressurizable sealed passageway which will not rapidly allow the passage of the internal pressurizing air under the high shock conditions attendant driving the automobile tire under typical traffic and road conditions.

Wherefore, it is the primary object of the present invention to provide a new and improved check valve for an inflatable game ball, whereby the ball can be initially inflated or repressurized as needed to any desired pressure so as to maintain its liveliness, or bounce, at a consistently high level, regardless of the time that has elapsed since the ball was first put into use.

Another important object of the invention is to provide a unique form of check valve that can be used with any inflatable article, such as an automobile tire, for example, which is simple and inexpensive to manufacture, reliable, and trouble-free.

It is yet another object of the present invention to provide a check valve that can be used in the control of fluid flow through a passageway which tends to increasingly seal the passageway in the presence of increased pressures tending to allow fluid flow in the non-desired direction.

SUMMARY OF THE INVENTION

The foregoing objectives and other advantages which will become apparent to those skilled in the art from the following detailed description have been achieved in the check valve of the present invention adapted for sealing a passageway having normally closed sealing means for opening to allow fluid to pass therethrough in the desired direction and for blocking low pressure fluid flow therethrough in the non-desired direction; and, normally opened sealing means carrying the normally closed sealing means over the opening of the normally opened sealing means for allowing fluid to pass therethrough to the normally closed sealing means in the desired direction and for closing to assist the normally closed sealing means in blocking fluid flow through the passageway in the non-desired direction. In the preferred embodiment shown, the normally opened sealing means is a deformable elastomeric material tapering simultaneously radially inward and axially in the direction of desired fluid flow being of a radial length such that each point around the periphery thereof is longer than the radius of the passageway at the point whereby the normally opened sealing means is tightly and increasingly wedged into the passageway by increased pressure of fluid attempting to flow through the passageway in the non-desired direction. Moreover, as the normally opened sealing means is wedged into the passageway a radially inward compressive force is created against the walls of the passageway within the normally opened sealing means tending to maintain the normally opened sealing means closed under pressure of fluid in the non-desired direction in the presence of radially outward expansion of the passageway to a radial distance at each point around the periphery thereof less than the radial length of the normally opened sealing means at the point. Thus, the check valve of the present invention is able to maintain its wedged closed status in the presence of shock and expansion of the material defining the passageway whether it be a game ball or an automobile tire.

DESCRIPTION OF THE DRAWINGS

FIG. 17(a)–(c) shows the wedging action of the valve of the preferred embodiment of the present invention in simplified form.

DESCRIPTION OF THE ILLUSTRATED AND PREFERRED EMBODIMENTS

Referring first to FIGS. 1 through 6, a tennis ball, generally indicated as 10, is shown as comprising a molded rubber shell 12 covered with a felt cover 14. As previously mentioned, the conventional tennis ball is manufactured without an inflation valve and the shell 12 and cover 14 are completely inperforate. Normally, the only visible marks are the seams 16 showing through the cover 14.

Tennis balls are normally pressurized at the factory and are packed in sealed containers that are also pressurized so that as long as the container remains unopened the air pressure is substantially the same in the container on the outside of the ball as the gas pressure is on the inside of the ball. As soon as the container is opened and the balls are exposed to atmospheric pressure, however, the gas under pressure within the balls begins to leak out in the manner previously described and, after a period of time, the ball becomes dead and is no longer usable.

Figures 4, 5:
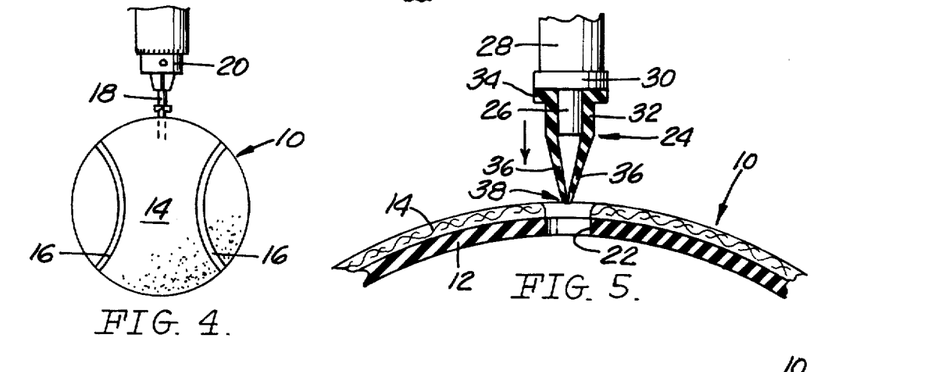
FIG. 4 is an elevational view of a tennis ball being drilled to receive an inflation valve insert.
FIG. 5 is an enlarged fragmentary sectional view of the tennis ball of FIG. 4 showing the inflation valve insert being inserted into the hole in the tennis ball.

A dead tennis ball may be restored to its original like-new pressure according to the method of my U.S. Pat. No. 4,012,041, by first drilling a small hole 22 (about ⅛ inch in diameter) through the cover 14 in shell 12 as shown in FIG. 4 using a drill bit 18 in the chuck 20 of a bench drill (not shown). An inflation valve insert 24 is then inserted into the hole 22. This is accomplished in the manner shown in FIG. 5 with the insert 24 mounted on the pin 26 on an arbor press 28. The arbor press 28 has a shoulder 30 that bears against the top end of the valve insert 24. When the arbor press 28 moves downwardly, as indicated by the arrow, the insert 24 is pressed into the hole 22 where it remains when the arbor press 28 is retracted.

In the example of FIGS. 1 through 6, the valve insert 24 is a small molded part made of soft natural rubber with a hollow cylindrical barrel 32 having a radial flange 34 at its top end. The bottom end of the cylindrical barrel 32 becomes wedge-shaped with two opposed converging flanges or lips 36 which come together at 38. There is a slit 40 at the convergence of the flanges 36 which is normally closed but which is opened by air pressure when the outside pressure is greater than the pressure inside. When the tennis ball 10 has been inflated to an inside pressure of 7 to 8 psi, the internal pressurized air presses a portion of the normally open portion of the sealing lips 36 together against one another tightly sealing the slit 40. The extremely soft resilient sealing lips 36 are pressed tightly together in good sealing contact even at the relatively low pressure (1 to 4 psi) used in racquet balls.

Figures 1, 2:
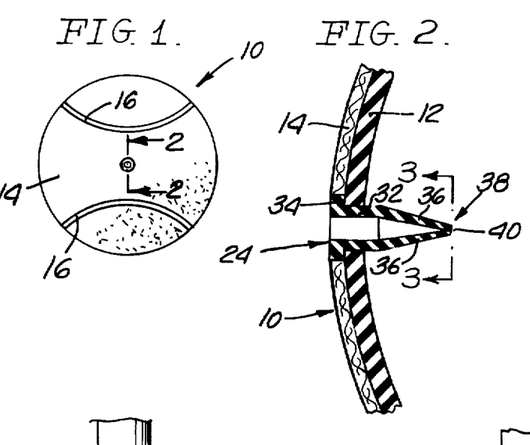
FIG. 1 is an elevation view of a tennis ball having an inflation valve disposed in the wall thereof.
FIG. 2 is an enlarged cross-sectional view of the tennis ball of FIG. 1 in the plane 2—2.
Figure 3:
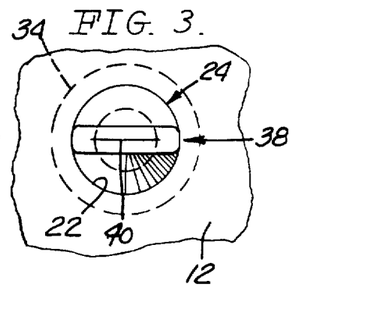
FIG. 3 is a fragmentary end view of the inflation valve of FIGS. 1 and 2 as seen in the plane 3—3 of FIG. 2.

At the time the valve insert 24 is prepared for insertion into the hole 22, a coating of suitable adhesive (not shown) is applied to the outer surface of the cylindrical barrel 32. When the insert 24 has been pressed into place, the adhesive dries, or sets, thereby cementing the insert 24 firmly to the shell 12. The adhesive can be any one of a number well known to those skilled in the art applicable to the materials employed and, of itself, forms no part of the present invention. The barrel 32 is also made slightly larger in diameter than the hole 22 so that the insert 24 is force-fit into the hole 22. As best shown in FIG. 2, the flange 34 is preferably the same thickness as the felt cover 14 so that there is no projection above the surface of the felt to interfere with the bounce of the ball.

With the inflation valve insert 24 thus cemented in place, the tennis ball 10 is ready to be repressurized. For repressurizing balls, a hand-pump, such as that shown generally as 42 in FIG. 6, may be used. Hand-pump 42 may take any desired form but is herein shown as comprising a plastic cylinder 44 in which a plunger 46 is slidably disposed. Plunger 46 has a cup-shaped, resilient piston 48 fixed to its inner end. Plunger 46 projects from the left-hand end of the cylinder 44 as viewed in FIG. 6 and has a knob handle 50 on its outer end. The right-hand end of cylinder 44 is reduced in diameter to form a nose-piece 52 which terminates in a small diameter cylindrical nozzle 54 that fits snugly into the hollow bore of the valve insert 24.

Figures 6, 7:
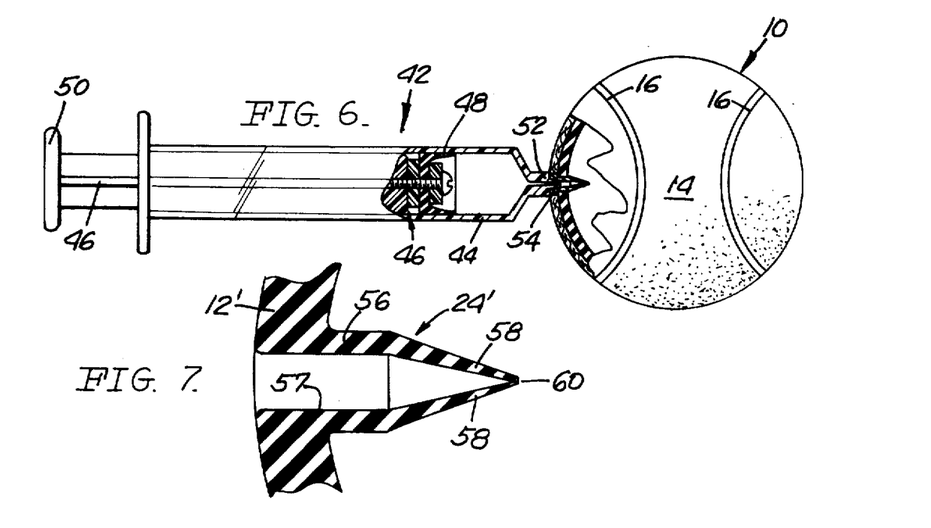
FIG. 6 is a partially cut-away view showing the tennis ball of FIG. 1 being inflated by a hand-pump having a nozzle that is inserted into the valve.
FIG. 7 is a fragmentary sectional view of a non-preferred inflation valve of the present invention molded integrally with the rubber shell of the ball.

With the nozzle 54 inserted into the bore of the valve insert 24 as shown in FIG. 6, plunger 46 can be pushed inwardly causing the cup-shaped piston 48 to force air into the tennis ball 10 through the valve 24. Plunger 46 may then be retracted (i.e. moved to the left) to cause the resilient skirt of piston 48 to flex inwardly to allow air to flow into the inner end of the cylinder 44 from the outer end thereof. The plunger 46 can then be pushed inwardly once again to force more air into ball 10. It has been found that after three or four pumps of the plunger 46, a typical tennis ball 10 can be reinflated to an inflation pressure equal to the pressure it had when brand new. In fact, tests have shown that an air pressurized ball pressurized to about 7.5 psi internal pressure provides the same bounce as a production tennis ball (non-valved) internally pressurized with filling gas (of unknown composition) at 12–13 psi. By itself, this would not appear to be important. Tests in actual play with the softer balls, however, have indicated that, not only do the balls play (i.e. bounce) identically to the harder production balls, but the felt fabric covering lasts longer—giving more play-time for the same initial investment in addition to the other benefits herein described.

A pressure gauge can be used, if desired, to check the inflation pressure at the time the ball is reinflated. This allows any number of tennis balls to be inflated to exactly the same pressure which is something that is seldom, if ever, obtained even with brand new balls of conventional type. It has been determined accurately in testing that a variation of only 0.5 psi in the internal pressure of a tennis ball makes a difference between a good bouncing ball and a poor one. Moreover, by employing the valve of the present invention, ball pressure can be adjusted for altitude whereas it has been the practice to make special balls for such places as Denver, and the like, at altitudes of 5,000 feet or more.

FIG. 7 shows an inflation valve 24' according to a non-preferred embodiment of the present invention molded integrally with the rubber shell 12' of a game ball. The rubber shell 12' may be covered with a felt cover if the ball is a tennis ball, or it may be left uncovered if the ball is a racquet ball. The integral inflation valve 24' is essentially the same as the valve insert 24 of FIGS. 1–6 in that it comprises a cylindrical barrel 56, with a central bore 57 and converging sealing lips 58 which come together and are separated by a slit 60 at the extreme end. FIG. 7 demonstrates that the valve of the present invention according to its non-preferred and preferred embodiments can be equally provided as an integral molded portion of a game ball, or the like, or, alternatively, as a valve insert for sealed insertion within a passageway provided in the material of the article after manufacture.

A ball made with either an integral inflation valve such as 24' or a valve insert such as 24 can be inflated at the factory by merely placing it in a pressure container wherein the pressure is built up to the desired inflation pressure during storage and shipment. With the pressure on the outside of the ball greater than the pressure on the inside, the sealing lips are spread apart slightly by the differential air pressure opening the slit and allowing air to enter the ball. As soon as the inside and outside pressures are equalized, however, the slit closes and the sealing lips come together to prevent any escape of air.

Figures 8, 9, 10, 11, 12:
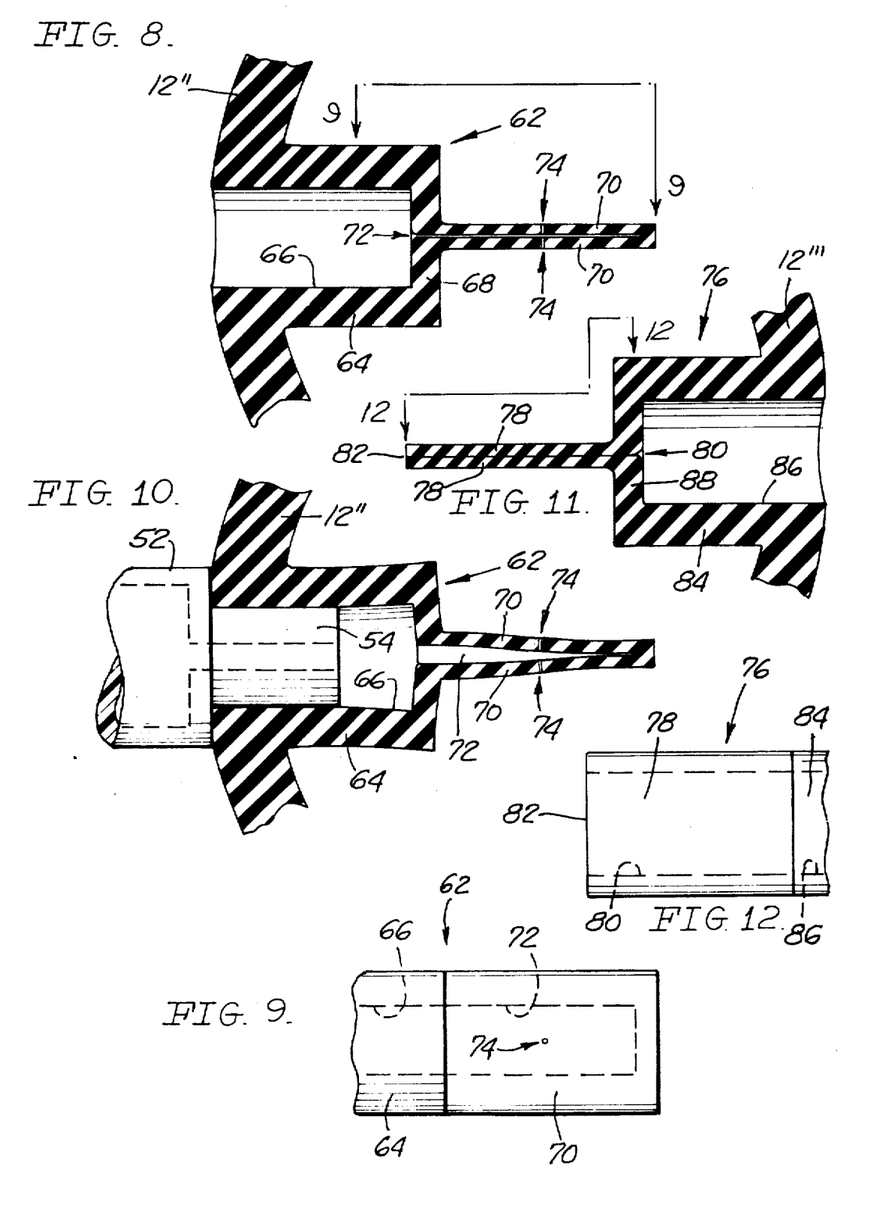
FIG. 8 is a fragmentary sectional view of another non-preferred embodiment of the inflation valve of the present invention.
FIG. 9 is a fragmentary sectional view of the valve of FIG. 8 as seen in the plane 9—9 of FIG. 8.
FIG. 10 is a view similar to that of FIG. 8 showing the thin flanges of the valve spread apart by air pressure thereby uncovering the holes through which air enters the ball.
FIG. 11 is a fragmentary sectional view through yet another non-preferred embodiment of the inflation valve of the present invention.
FIG. 12 is a fragmentary elevational view as seen in the plane 12—12 of FIG. 11.

FIGS. 8, 9, and 10 show a second non-preferred embodiment of the inflation valve of the present invention. In this case, the valve, generally indicated as 62, comprises a cylindrical barrel 64 which is molded integrally with the rubber shell 12". It should be apparent that valve 62 could also be incorporated as part of an insert. Barrel 64 has a central bore 66 which terminates at an end wall 68. Projecting inwardly from end wall 68, towards the center of the ball, are two thin sealing lips 70 which are separated from one another from most of their length by a slit 72. At their outer ends and along their side edges, the sealing lips 70 are joined together, as best shown in FIG. 9. Midway between their ends, the sealing lips 70 are pierced by very small diameter holes 74, which provide the entrance through which air is admitted into the ball.

When the valve 62 is relaxed, with equal pressure inside and out, the sealing lips 70 may be in contact with one another, or they be spaced very slightly apart, as shown in FIG. 8. However, as soon as the pressure inside the ball exceeds the outside pressure, the sealing lips 70 are pressed tightly together by the air pressure, and holes 74 are sealed. Inserting the nozzle 54 of an air pump such as 24 into the bore 66 and actuating the pump thereof causes the higher pressure to balloon the inner end of the barrel 64 slightly, as shown in FIG. 10, spreading the sealing lips 70 apart slightly and exposing the holes 74 so that air can pass into the interior of the ball.

A third non-preferred embodiment of the present invention is shown in FIGS. 11 and 12 and is designated generally as 76. This embodiment is similar to that shown in FIGS. 8–10, except that the sealing lips 78 are separated from end to end by a slit 80 which opens at 82 into the interior of the ball. As in the preceding embodiment, valve 76 has a cylindrical barrel 84 molded integrally with the rubber shell 12''' (or into an insert). Formed within the barrel 84 is a central bore 86. The bore 86 terminates at an end wall 88 from which the sealing lips 78 project inwardly toward the center of the ball.

When the ball is pressurized internally, sealing lips 78 are passed tightly together by air pressure, sealing the slit 80 so that air cannot escape. However, when the pressure inside the bore 86 exceeds the pressure within the ball, as when the pump 42 is being used, sealing lips 78 readily open to allow air to enter the ball.

FIGS. 13–16, 18, 19 and 22–27 show what is now considered to be the preferred embodiment of the present invention inasmuch as extensive testing has shown it to be superior in all regards to the other forms shown in and described hereinbefore. The method of operation of the preferred embodiment of the present invention is best understood with reference to the simplified drawings thereof of FIGS. 17(a) through 17(c). Inasmuch as the preferred embodiment, to be described hereinafter, is most often shown as an integral valve, the valve, generally indicated as 100, of the simplified drawing of FIG. 17(a)–(c) is shown as a valve insert.

Figure 17:
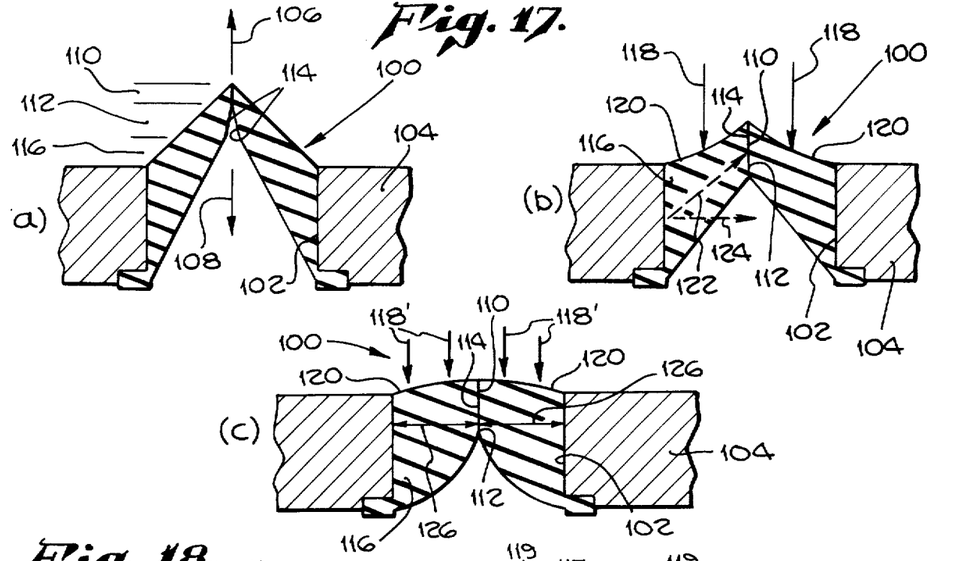

Valve 100 is disposed within a hole (passageway) 102 provided in the sidewall 104 of a container. As shown in FIG. 17, valve 100 is disposed to allow fluid passage in the direction of arrow 106 and prevent fluid passage in the direction of arrow 108. Valve 100 is of unitary construction and is molded of a soft pliable elastomeric material. Soft natural rubber is preferred. However, any material having the deformation and sealing qualities of soft natural rubber can be employed. Valve 100 is annular in shape and of such a thickness adjacent the sides of hole 102 that, in conjunction with the support provided by the sidewalls of hole 102, it resists deformation in the axial direction closely adjacent the sidewalls of hole 102. Valve 100, however, tapers radially inward and axially in the direction of desired fluid flow (i.e. in the direction of arrow 106) becoming thinner the further it gets from the sidewalls of hole 102. Valve 100 tapers together becoming oval in cross-section and ultimately coming into sealed mating relationship at the opposite end thereof from the end in contact with the sidewalls of hole 102. Being of a deformable elastomeric material such as soft rubber and tapering towards increased thinness, valve 100 becomes more readily deformable towards the center of hole 102. As can be seen in FIG. 17(a), with no pressure applied, valve 100 is disposed with the portion at the extreme inner ends thereof labeled 110 in sealed mating contact. Portion 110, therefore, forms a normally closed valve which resists fluid flow in the direction of arrow 108 but which will part (open) to allow the passage of fluid in the direction of arrow 106. Below normally closed portion 110 is a normally opened portion 112. That is, the facing inner surfaces 114 of valve 100 in the area 112 are separated to provide a passage therethrough. The balance of valve 100 can be considered as an annular body portion which has been labeled as 116 for convenience.

Referring now to FIG. 17(b), the action of valve 100 upon the introduction of fluid pressure in the direction of arrow 108 is shown. Fluid (as represented by the arrows 118) is initially prevented from passing through valve 100 by the action of normally closed portion 110. Accordingly, fluid 118 presses on the upper surfaces 120 of valve 100. Valve 100, therefore, begins to deform into hole 102 from the pressure of fluid 118. As previously mentioned, valve 100 is more readily deformable adjacent the center thereof and becomes increasingly less deformable adjacent the sidewalls of hole 102 (i.e. in the area of annular body portion 116). Consequently, facing internal surfaces 114 of normally opened portion 112 are first brought into sealed contact as valve 100 assumes the position of FIG. 17(b).

Valve 100 is constructed such that the length at any point about the periphery thereof from the sidewall of hole 102 to the facing internal surfaces 114 (as indicated by the dashed arrow 122) is longer than the radius of the hole 102 at the same point (as indicated by the dashed arrow 124). This being the case, as greater fluid pressure is created as indicated by the heavier arrows 118' in FIG. 17(c), valve 100 is tightly wedged into hole 102 on an increasing basis as the pressure of fluid 118 is increased. Since valve 100 is of a deformable elastomeric material, such as rubber, internal compression forces as indicated by arrows 126 are created within valve 100 between the sidewalls of hole 102 acting on the facing internal surfaces 114 of both normally closed portion 110 and normally open (now closed) portion 112 tending to hold valve 100 tightly closed in the presence of shocks and forces. Additional features and benefits will be described hereinafter.

Figures 13, 14, 15, 16:
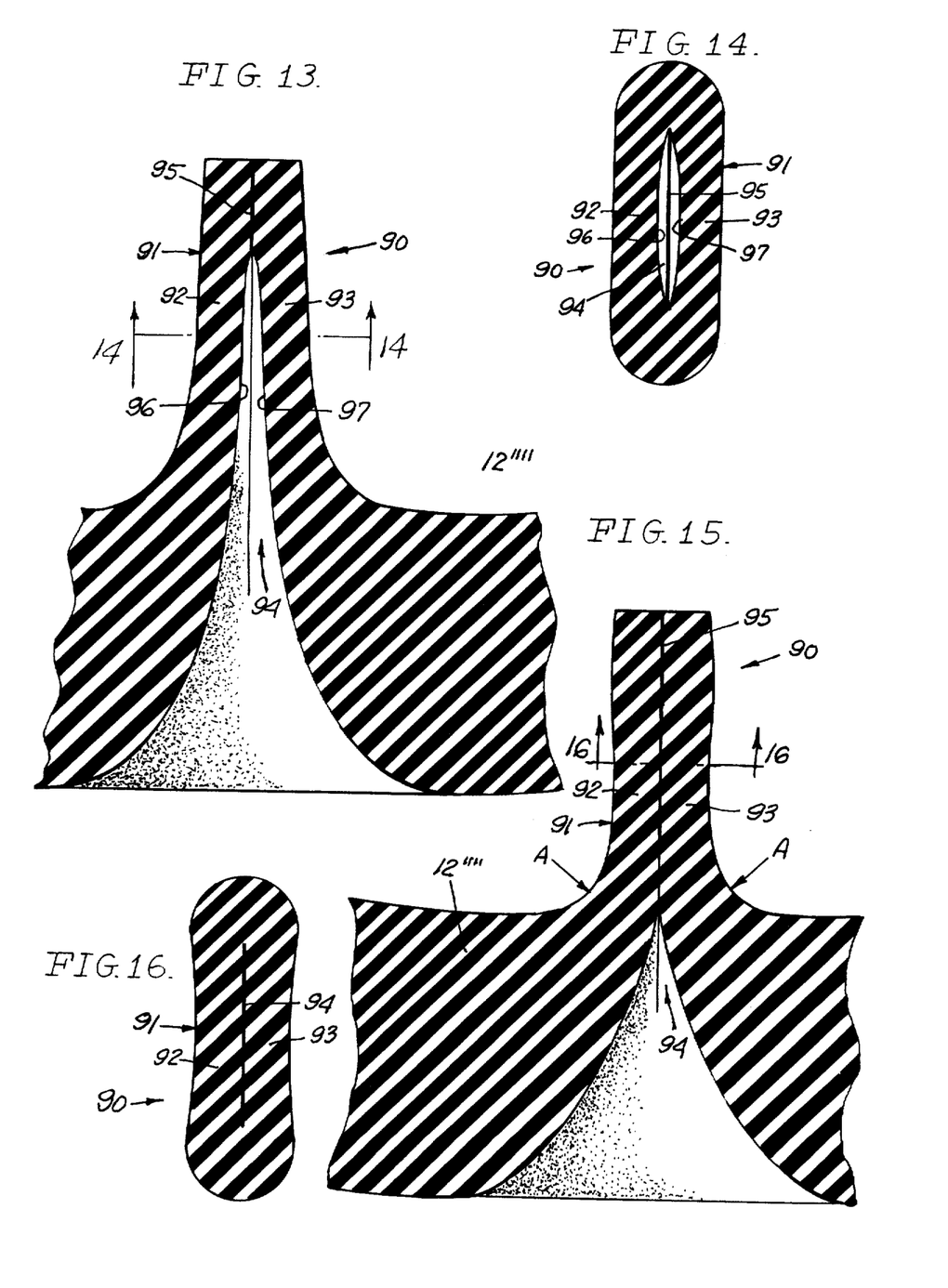
FIG. 13 is a greatly enlarged fragmentary sectional view through the wall of an inflatable game ball, showing what is now considered to be the preferred embodiment of the invention, the valve being shown as it appears when the ball is un-inflated.
FIG. 14 is a sectional view through the valve of FIG. 13 at the plane 14—14 of FIG. 13.
FIG. 15 is a view similar to FIG. 13, showing the valve of the preferred embodiment of the present invention as it appears when the ball is inflated.
FIG. 16 is a sectional view taken in the plane 16—16 of FIG. 15.
Figures 18, 19, 20, 21:
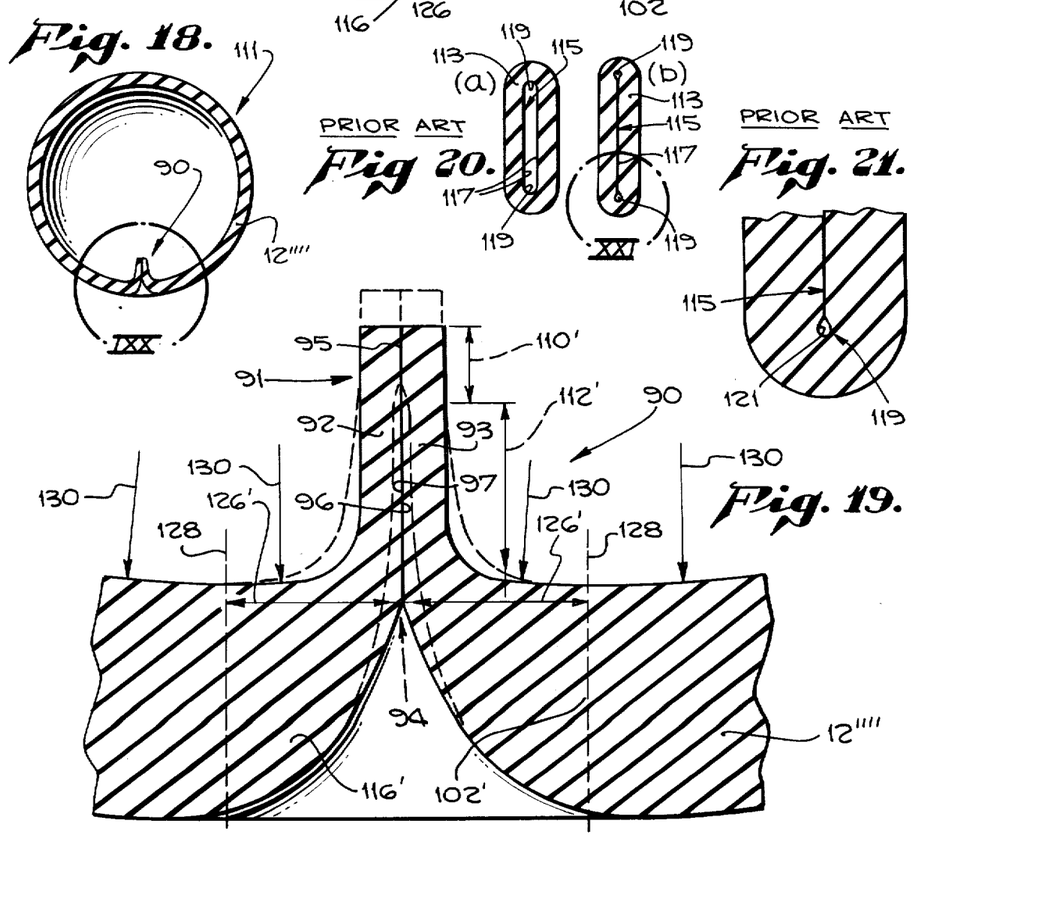
FIG. 18 is a cut-away elevation of a racquet ball employing the valve of the preferred embodiment of the present invention.
FIG. 19 is a detailed composite view of the valve of the present invention of the ball of FIG. 18 showing the action of the forces thereon when the valve is employed in the wall of a game ball and relating the construction of the preferred embodiment of the present invention as actually tested and constructed to the simplified drawing of FIG. 17.
FIG. 20 is a cut-away section through a typical check valve of the prior art as employed in a game ball showing the un-pressurized (a) and pressurized (b) conditions thereof.
FIG. 21 is a detailed view of a portion of FIG. 20 showing the minute leakage path that exists in prior art game ball check valves.
Figure 22:
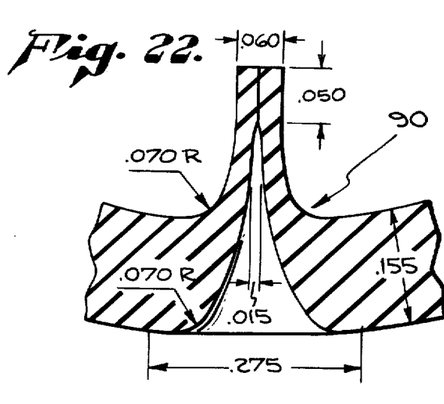
FIGS. 22–23 are dimension drawings of a valve according to the preferred embodiment of the present invention as employed and tested in racquet and tennis balls.
Figure 23:
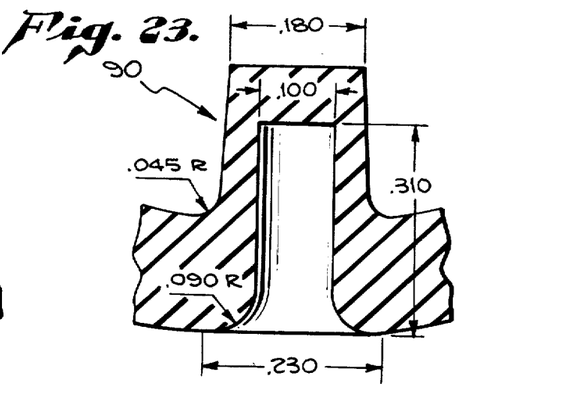

Referring now to FIGS. 13–16 and 18–21, the foregoing operation can be seen as it is applied to the preferred embodiment of the present invention incorporated as an integral molded valve in the sidewall 12'''' of a game ball such as the racquet ball 111 of FIG. 18. In this embodiment, the check valve, generally indicated as 90, is in the form of an inwardly projecting, flattened tubular nipple 91, having rounded edges (as shown in FIGS. 14 and 16) and flat sides 92 and 93 which are separated by an internal cavity 94. The cavity 94 becomes bell-shaped as it approaches and opens to the exterior of the ball. That is, the cavity smoothly curves from being substantially normal to the surface of the ball on the inner end to being tangential to the ball's surface at the exterior end. At its inner extremity, the nipple 91 is initially molded with a solid closed end, which is lanced through with a sharp blade, leaving a slit 95 that is normally held closed by the elasticity of the rubber but which can be forceably spread apart, as when the air pressure in the cavity 94 is greater than the pressure inside the ball.

The construction of the cavity 94 provides, in combination with the wedging action described herein, the virtually leak-proof benefits of the present invention even in high-shock environments. The cavity 94 has been formed by molding it employing a male mold piece having knife edges and a mirror-smooth polished surface for the portion forming at least the inner half of cavity 94. As a result, the formed cavity 94, for at least the inner half of its length, is a laterally-elongated narrow slit having slightly spaced mirror-smooth facing surfaces 96 and 97. The slit tapers to the lateral knife edges shown in FIG. 14. Additionally, the inner end of the cavity 94 also tapers to the knife edge shown in FIG. 13.

Referring briefly to FIGS. 20 and 21, a section through a typical prior art check valve is shown. FIG. 20(a) corresponds to FIG. 14 and FIG. 20(b) corresponds to FIG. 16, as a point of reference. The valve member 113 has a slit 115 therein formed by standard prior art techniques. Accordingly, the inner surfaces 117 thereof contain at least minute serrations (sometimes major ridges) and the ends 119 are radiused. As can be seen in the detailed view of FIG. 21, a complete seal cannot be obtained with such prior art sealing slit construction. The radiused ends 119 never completely seal. A minute passageway 121 remains. Moreover, as the inner surfaces 117 move with respect to one another due to the shocks of game play, minute channels are formed communicating with the passageways 121 due to the serrations and the like on the surfaces 117.

By employing the polished surfaces and knife edges of the present invention, the heretofore unrecognized leakage paths of prior art game ball check valves are eliminated. As a result, when the nipple 91 is collapsed by air pressure within the ball, a portion of the cavity 84 is closed and sealed airtight. In this collapsed or closed condition, coupled with the wedging action, the valve 90 is tightly sealed against leakage and no air escapes from the ball even during the most violent game play.

The relationship of the valve 90 to the method of operation of the wedging action thereof, hereinbefore described in simplified form with reference to FIG. 17, can best be understood with simultaneous reference to FIGS. 17 and 19 (wherein valve 90 is shown in superimposed normal and pressurized states i.e. FIG. 13 in ghosted superimposition on FIG. 15). As can be seen, the area of nipple 91 containing the lanced slit 95 comprises the normally closed portion and is, accordingly, labeled 110'. In like manner, the area of nipple 91 comprising flat sides 92 and 93 separated by internal cavity 94 (having the described knife edges and polished surfaces) comprises the normally opened portion and is, accordingly, labeled 112'. The area of rubber of the shell 12'''' of the ball bounded by the dashed lines 128 is the passageway (hole) and is, accordingly, labeled 102' for relation to the previous discussion relative to FIG. 17. Valve 90 as shown in FIG. 13 and the ghosted position of FIG. 19 corresponds to simplified valve 100 of FIG. 17(a). Thus, in corresponding fashion, during the first stroke or two of the pump when the ball is being inflated from no or very low internal pressure, the lanced slit 95 serves as an initial seal to prevent air from leaking out before enough pressure can be built up within the ball to collapse the sidewalls of the nipple 91.

As air pressure builds up, the nipple 91 collapses from the lateral pressure forces and the polished surfaces 90, 97 close against one another to form the secondary airtight seal that is capable of holding the relatively high shock load pressures that are created when a fully inflated ball is hit hard by a racquet. Then, as shown in FIG. 15 and FIG. 19, as internal pressure (indicated by the arrows 130) continues to increase, the valve 90 is deformed increasingly into wedged contact with the sidewalls of the integral hole 102'. Since the length of the nipple 91 from the boundary lines 128 at any point is longer than the radius of the passageway 102' (in the same manner as described in relation to FIG. 17(b)), the internal compressive forces indicated by the arrows 126' are created in the same fashion as previously described with relation to FIG. 17(c). It is these internal compressive forces 126' which maintain valve 90 in its tightly closed state under the relatively high shock load pressures previously described as being a necessity for acceptable operation within the desired environment. This is true even if the passageway expands due to stretching of the rubber. The compressive forces 126' remain as long as the radial distance at each point around the periphery of the valve 90 remains less than the radial length of the normally open portion of valve 90 at the same point (i.e. the relationship of dotted arrows 122 and 124 of FIG. 17(b) holds).

Figure 24:
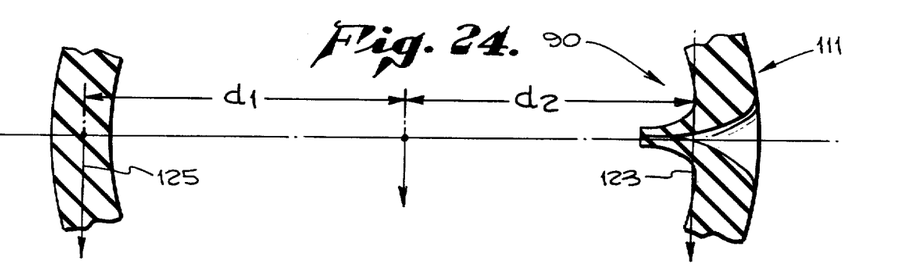
FIG. 24 is an enlarged cut-away drawing of a portion of a racquet ball employing the preferred embodiment of the present invention showing how the valve provides dynamic balancing of the ball.

It is worthy of note that the design of the valve 90 is such that when constructed of substantially similar material to the ball, the total volume of rubber in the nipple 91 is almost exactly the same as the air space volume of the cavity 94. Additionally, as shown in FIG. 24, the valve 90 is distributed along a radius line such that its slightly heavier weight (as shown by the arrow 123) acts through the radial distance $d_2$ which is slightly shorter than the distance $d_1$ through which the weight opposite (shown by arrow 125) acts such that the rotational forces on ball are equal and opposite making the ball dynamically balanced. As a consequence, the valve 90 has no appreciable effect on the balance of a tennis ball or racquet ball wherein it is disposed. Such a consideration could also be of importance when incorporating a valve into such items as a high speed tire. Note that in such applications, the valve of the present invention provides not only simplicity of design, but, additionally, could virtually eliminate the need for tire balancing while providing a valve which seals tighter at higher pressures and is shock resistant.

As previously mentioned, the valve of the preferred embodiment of the present invention as shown herein can be made as an insert, to be inserted into a hole drilled in a game ball or the like, as in FIGS. 4 and 5, or molded integrally with its rubber shell. The inflation check valve of the present invention is applicable to all ball types using compressed air or other gas to create bounce and is particularly suitable for tennis balls and racquet balls. Consequently, as a result of the present invention, the internal pressure within an inflated game ball can be adjusted, measured, and maintained on an accurate basis—even to the extent of using a mercury monometer to measure the pressure, if desired.

If it should be necessary to reduce the inflation pressure, all that is necessary is to insert a toothpick, paper clip, or the like into the valve opening so as to spread the sealing lips apart and break the seal. The adjusted pressure can be set to an accuracy of ± a fraction of an inch of mercury employing the valve of the present invention. The valve of the present invention is simple and inexpensive to manufacture. Of critical importance in achieving the desired objectives, however, the valve has its sealing lips located remote from the areas of distortion caused by play. As a result, the valve will withstand a great deal of distortion of the rubber shell without breaking its seal. Other valves constructed according to the teachings of the prior art that have been tested break their seal when the ball is hit hard as when being struck or in striking a surface during play.

Note that in employing the valve of the present invention, pressure can be introduced through the valve either by a simple hand-pump (as hereinbefore described in detail) or by placing the balls in large lots in a pressure chamber wherein the balls can be almost instantly pressurized to the same pressure and not varying widely as is not possible when employing the present method of making such balls. Moreover, the balls do not have to be packaged in pressure containers for shipment or storage. If they have lost any pressure, it can be restored in a matter of seconds with a simple pocket-sized hand-pump. By repressurization of tennis balls when they have started to lose their bounce, it is possible to extend the useful life of a tennis ball until the felt cover has become so worn that the ball is no longer playable.

As previously mentioned, the check valve shown herein, and in particular the preferred embodiment, are not limited to use on game balls, but might be used with any inflatable article such as air mattresses, inflatable pool accessories, and the like, or in the control of fluid through any passageway. For example, other uses of the valve of the preferred embodiment of the present invention are shown in FIGS. 25–27.

Figure 25:
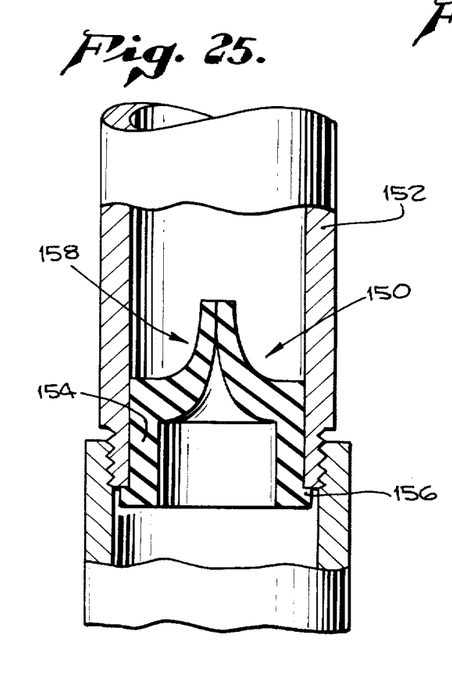
FIG. 25 is a cut-away section through a pipe showing the valve of the preferred embodiment of the present invention employed as a one-way fluid check valve therein.

In FIG. 25, a fluid check valve, generally indicated as 150, is shown disposed co-axially within a pipe 152 so as to permit fluid flow in only one direction therethrough. The valve 150 has a cylindrical body 154 of rigid or, at least, semi-rigid construction. A ridge 156 is provided about the periphery on one side to prevent the valve 150 from moving into the pipe 152 past its point of insertion. The opposite end of the valve 150 is provided with a sealing portion 158 as hereinbefore described.

Figure 26:
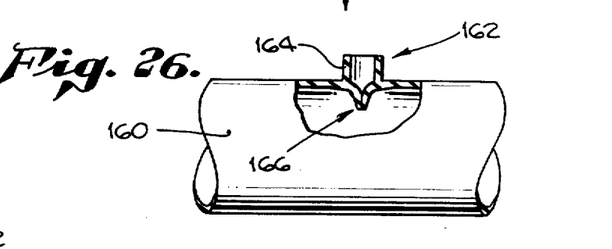
FIG. 26 is a partially cut-away portion of a bicycle inner tube or the like employing the valve of the preferred embodiment of the present invention.

In FIG. 26, an inner-tube 160 for a bicycle, or the like, is shown incorporating a valve of the present invention, generally indicated as 162. The valve 162 could be molded as part of the tube 160 or attached thereto as by vulcanizing. The valve 162 comprises a rigid or, at least, semi-rigid cylindrical body portion 164 adapted to pass through the hole typically provided therefor in the rim to which an inflation hose can be connected for filling the tube 160. Internally to the tube 160, the body portion 164 is again provided with a sealing portion 166 according to the hereinbefore described preferred embodiment of the valve of the present invention.

Figure 27:
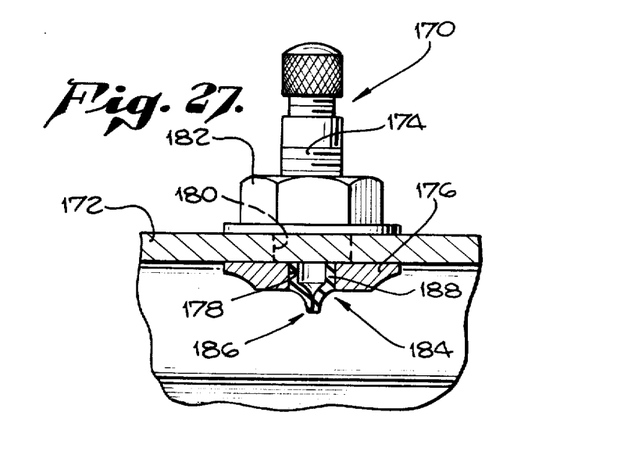
FIG. 27 is a partially cut-away portion of a tubeless tire rim employing a valve member incorporating the preferred embodiment of the present invention.

Finally, in FIG. 27 a tubeless tire valve assembly, generally indicated as 170, is shown mounted through a tubeless tire rim 172. The valve assembly 170 comprises an externally threaded body 174 having a shoulder 176 on one end and a passageway 178 longitudinally therethrough. The body 174 is passed through a hole 180 provided therefore in the rim 172. A nut 182 is then threaded onto the body 174 to draw the shoulder 176 tight against the rim 172 into sealed engagement therewith. A valve assembly, generally indicated as 184, incorporating a sealing valve portion 186, according to the preferred embodiment of the present invention, carried on a body portion 188 is disposed within the passageway 178.

Having thus described by invention, I claim:

1. A unitary check valve for sealing a passageway to allow pressurized fluid to flow axially through the passageway in one direction and prevent pressurized fluid from flowing axially through the passageway in the opposite direction comprising:
   (a) an annular body portion carried coaxially within the passageway, said body portion being thick enough in the axial direction adjacent the outer edges of the passageway that in combination with the support provided by the material defining the passageway said portion is substantially non-deformable in the axial direction; and,
   (b) a sealing nipple portion carried within said body portion tapering radially inward and axially in the direction of desired fluid flow from said body portion on one end to meet in sealed contact adjacent the opposite end, the thickness of said sealing nipple portion in the axial direction becoming increasingly thinner and correspondingly increasingly deformable in the axial direction radially inward from said one end whereby the application of fluid under pressure to said valve in the direction opposite desired fluid flow causes said nipple portion to be deformed axially into said body portion in a wedging action increasingly sealing the passageway as increased fluid pressure is applied, said taper being a smooth curve extending from a point on a line substantially normal to the axis of the passageway on said one end to a point on a line substantially parallel to the axis of the passageway on said other end whereby fluid pressure within the passageway tending to move fluid through the passageway in a non-desired direction acts normal to the axis on said nipple portion adjacent said other end to initially prevent fluid passage therethrough as it also acts axially on the rest of said nipple portion to deform said nipple portion in said wedging action into said body portion, said nipple portion being of a material having the deformion and sealing qualities of soft natural rubber, the surfaces of said nipple portion that meet during said wedging deformation into said body portion having a finish produced by a mirror-smooth mold.

2. The check valve of claim 1 wherein:
   the length of said nipple portion from said one end to said other end is sufficiently long in relation to the deformability thereof that said other end remains in sealed contact and said nipple portion still deformably wedges into said body portion when said body portion is deformed radially outward by expansion of the material defining the passageway.

3. The check valve of claim 1 wherein:
   said mirror-smooth inner surfaces that are pressed together in fluid-tight sealing engagement come together in knife edges.

4. A unitary check valve of moulded elastomeric material comprising:
   (a) a substantially flattened tubular nipple portion having external rounded edges and generally flat sides defining an internal cavity with an elongated axis, said cavity smoothly curving from a point on a line normal to said axis at the entrance end of said nipple to a point on a line parallel to said axis as it approaches and opens to the interior end of said nipple;
   (b) said nipple having an inner end defining an inner extremity of said cavity, said inner end being a solid closed end having a thin slit therethrough which communicates with said cavity, said slit being normally held closed by the elasticity of the elastomeric material; and,
   (c) said cavity being configured for at least an inner half of its length in the form of a laterally elongated narrow slit having spaced walls produced from a mirror-smooth mold, said walls tapering down to lateral knife edges, said cavity being further configured at its inner end adjacent said solid end of said nipple by its tapering down to a knife edge adjacent and communicating with said thin-slit opening.

5. An inflatable game ball including the valve recited in any of claims 1, 2 or 3.

* * * * *